Figure 1:
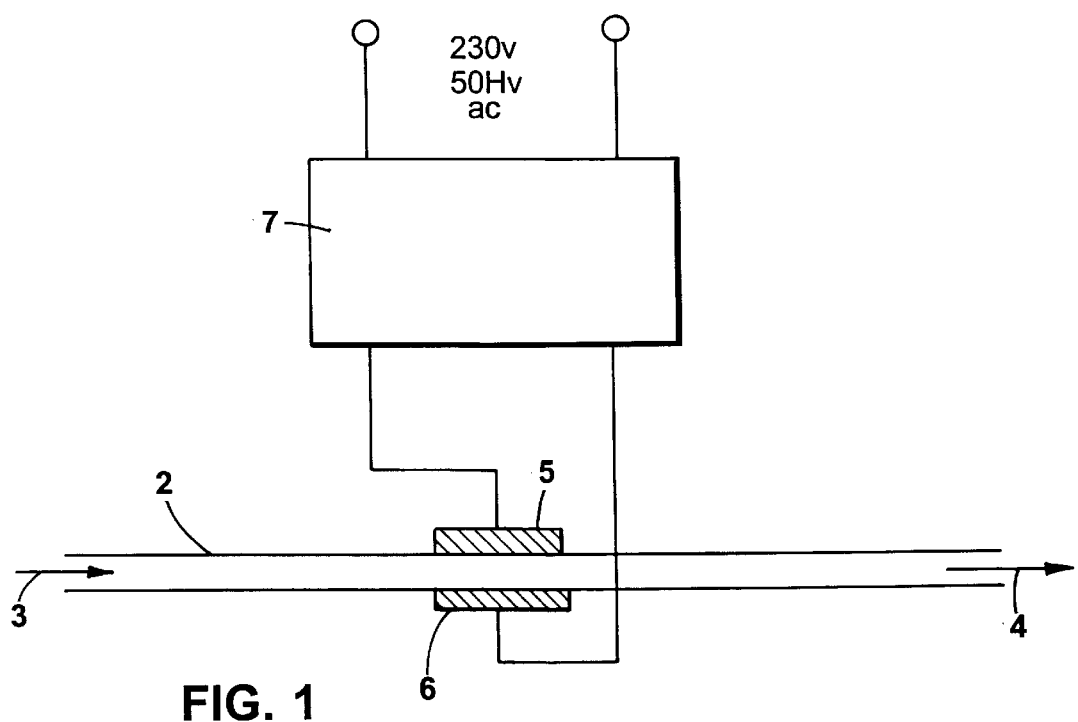

United States Patent [19]
Bodger et al.

[11] Patent Number: 5,851,375
[45] Date of Patent: Dec. 22, 1998

[54] APPARATUS FOR DISINFECTING FLUIDS

[75] Inventors: Patrick S. Bodger; Paul T. Johnstone, both of Christchurch; Andrew G. Jacquiery, Wellington, all of New Zealand

[73] Assignee: Ennotech Holdings Limited, Christchurch, New Zealand

[21] Appl. No.: 776,659

[22] PCT Filed: Jul. 26, 1995

[86] PCT No.: PCT/NZ95/00066

§ 371 Date: Jan. 30, 1997

§ 102(e) Date: Jan. 30, 1997

[87] PCT Pub. No.: WO96/04206

PCT Pub. Date: Feb. 15, 1996

[30]     Foreign Application Priority Data

Aug. 5, 1994  [NZ]  New Zealand ............................ 264188

[51] Int. Cl.⁶ ..................................................... C02F 1/461
[52] U.S. Cl. ........................... 205/701; 205/742; 204/275
[58] Field of Search ..................... 205/701, 742; 204/275

[56]            References Cited

U.S. PATENT DOCUMENTS 3,725,226  4/1973  Stoner ........................................ 205/701
3,753,886  8/1973  Myers ........................................ 205/701
5,259,972  11/1993  Miyamaru et al. ...................... 210/652
5,282,940  2/1994  Griffis et al. ............................. 205/701
5,554,295  9/1996  Ban et al. ................................. 210/668
5,575,974  11/1996  Wurzburger et al. .................... 205/701

FOREIGN PATENT DOCUMENTS 2-284689  11/1990  Japan .
1011-545-A  4/1983  U.S.S.R. .

OTHER PUBLICATIONS

ISA/AU, International Search Report, 13 Nov. 1996.

*Primary Examiner*—Arun S. Phasge
*Attorney, Agent, or Firm*—Fish & Richardson, P.C.

[57]            ABSTRACT

An apparatus for disinfecting a continuous flow of an electrically conductive liquid such as water which is contaminated by cells of microorganisms. The apparatus consists of a container through which liquid to be disinfected flows, and at least one pair of non-sacrificial electrodes which are positioned in the container so that liquid flowing through the container is in contact with the electrodes. A steady state electric voltage is applied across the electrodes so as to create a voltage gradient between them, the voltage gradient being such that an arc is not struck between the electrodes but a voltage gradient of at least one volt is produced across the membrane of any cell in the liquid, thereby causing dielectric breakdown of the cell membrane and electropermeabilization of the membrane.

36 Claims, 2 Drawing Sheets

APPARATUS FOR DISINFECTING FLUIDS

The application was filed as international application PCT/NZ95/00066 on Jul. 26, 1995.

TECHNICAL FIELD

The present invention relates to an apparatus for disinfecting liquids, as a continuous process.

BACKGROUND ART

Over the centuries, the problem of adequately disinfecting a wide range of liquids—from drinking water to milk to chemical preparations to sewage—is one that has been tackled in many different ways, but as yet no complete satisfactory solution has been found. In particular, the disinfection of drinking water poses special problems; the method of the present invention is especially suitable for disinfecting drinking water, and will be discussed with a special reference to this application. However, it must be appreciated that the method and apparatus of the present invention may in fact be used to disinfect any of a wide variety of electrically conductive liquids.

Disinfecting a potable water supply poses particular problems:—firstly it can be contaminated with a wide range of disease bearing micro-organisms, which may vary greatly in size:—for example, one possible contaminant is a protozoa 'Giardia' which is a relatively large micro-organism, but the same water supply may also be contaminated with bacteria and viruses, which are very much smaller. Thus, filtering the water to remove the micro-organisms often is not a viable option:—the size of some of these micro-organisms is so small that it simply is not feasible to force large volumes of water through the very fine filters needed to remove them. A further drawback to filtering is that it does not kill the contaminating micro-organisms, but merely removes them and there is no visible sign when a filter becomes choked or otherwise ceases to function correctly.

Another option for water disinfection is to use a chemical disinfecting agent such as chlorine, or sodium hypo-chlorite or ozone. The chemical treatment may be used in combination with filtration or on its own. Chemical disinfection is reasonably effective if used properly, but has a number of drawbacks:—firstly chemically resistant strains of micro-organisms tend to develop, and the longer chemical disinfection is used, the more likely this problem is to occur. Secondly, chemicals which are sufficiently powerful to disinfect large volumes of water quickly and effectively, inevitably are not entirely beneficial to human beings either, and there is increasing concern as to the effect of some of these chemicals on human beings, particularly when ingested over a long period of years. In addition, most people can detect the taste of treatment chemicals in a water supply, and find it unpleasant.

Ultraviolet radiation may also be used to disinfect a water supply. However, any turbidity in the water reduces its effectiveness and it is not in general suitable for large scale treatment.

A further method of disinfecting water, which has been proposed over the years, is to use electrical or electromagnetic treatment to kill micro-organisms present in the water.

There have been a very large number of prior proposals made describing different types of apparatus for electrical or electromagnetic disinfection of water or other liquids. These prior proposals are discussed below but it should be noted that a coherent discussion of prior proposals is made very difficult by the fact that in many of the patent specifications, relatively few details of the methods used are given, and in a majority of cases, no mechanism for the disinfecting effect of the treatment is described or even suggested. In the case of a number of the prior proposals, it is difficult to see how the described techniques could work, or at least could work effectively.

One major group of prior proposals deals with a technique known as electro-hydraulic shock. This technique involves sending an electrical arc through the fluid medium between electrodes in the medium. The electric arc imposes a sudden mechanical shock on any micro-organisms in its vicinity and, so to speak, bludgeons the micro-organisms to death. Devices of this sort are disclosed in, for example, U.K. patent 1118492, UK patent 1108524, UK patent 1105870, U.S. Pat. No. 3,402,120, and U.S. Pat. No. 3,366,564. The principal draw back with disinfection treatment by electro-hydraulic shock is the very high power requirements:—generating an arc under these circumstances requires a very high level of power use, and this makes the process correspondingly expensive.

Another type of electrical treatment for water disinfection is to use the electrical power to generate a supply of ions from one or other electrode, and these ions exert a disinfecting effect on the liquid i.e. the treatment is partly electrical and partly chemical. Apparatus of this type is disclosed in, for example, U.K. patent 2031025, U.S. Pat. No. 4,713,170 and U.S. Pat. No. 4,936,979. It will be appreciated that such methods, whatever their effectiveness may be, inevitably have the drawbacks of purely chemical treatment of water for disinfection purposes i.e. contamination of the water supply with the ions used for treatment.

U.K. patent 2196954 discloses a method of disinfection using an electrostatic field effect. The mechanism whereby such a field effect disinfects a liquid is not clearly described in the specification, but what is clear from the specification is that a very high voltage is required (typically AC 50,000 volts), and at least one of the electrodes is electrically insulated from the liquid.

Disinfection using an electromagnetic field effect is disclosed in PCT WO88/05763, U.K. patent 1554893 and U.K. patent 713161. The precise mechanism whereby an electromagnetic field disinfects the liquid is not described, but all three specifications appear to rely on a high frequency electro-magnetic field for the disinfecting effect.

A further large group of prior art specifications disclose the disinfection of a liquid by passing through that liquid a series of electrical impulses i.e. unidirectional, one-off pulses. Examples of this type of approach are given in patents EPA 30 148380, EPA 30 283700, EPA 0060193, U.S. Pat. No. 2,081,243, U.K. 2122870, and U.K. 845743. Not all of the specifications state specific current or voltage ranges, but it seems reasonably clear that high voltages and a relatively high current density are necessary for the effective use of this technique. It is made clear that a pulsing effect is necessary for disinfection. To produce the impulses, relatively complex and expensive equipment is required, and since the impulses are spaced apart in time, the technique is safe only for a batch process, where a batch of liquid can be held until it is certain treatment has been completed. If this technique is used for a continuous process, there is a risk that micro-organisms will pass through the treatment zone between impulses, and emerge untreated, although some of the techniques described try to overcome this problem by passing the liquid to be treated through multiple sets of electrodes.

A broadly related method is disclosed in U.K. patent 1038405, German patent 2037569 and U.S. Pat. No. 3,753,886, all of which disclose disinfection by means of an electric current action i.e. it is the effect of a current passed through the liquid to be disinfected which is said to produce the necessary disinfecting action. These patents do not suggest that the voltage across the liquid is of any consequence—it is purely the effect of the current which disinfects. However, the research upon which the present invention is based indicates that for effective disinfection, the voltage applied across the liquid must exceed a threshold value.

DISCLOSURE OF INVENTION

It is an object of the present invention to provide a method and apparatus for disinfecting an electrically conductive liquid which is less costly to build and to use than the apparatus disclosed in the prior art, and which is capable of providing rapid, low cost, effective disinfection.

The present invention provides apparatus for disinfecting a continuous flow of an electrically conductive liquid, containing cells of micro-organisms, said apparatus comprising:

a container having an inlet and an outlet, through which liquid to be disinfected flows in use;

at least one pair of non-sacrificial electrodes, said electrodes being positioned in said container so that liquid flowing through the container is in contact with said electrodes;

means for applying a steady-state electric voltage across said electrodes so as to create a voltage gradient between said electrodes;

said voltage gradient being such that an arc is not struck between said electrodes but a voltage gradient of at least one volt is produced across the membrane of any cell in said liquid, causing dielectric breakdown of the cell membrane and hence electro-permeabilization of said membrane.

The voltage across the electrodes needed to produce the required voltage across the cell membrane depends upon the conductivity of the liquid and the electrode spacing, and upon the cell size and shape and the polarization of the membrane.

As used herein, the term 'steady state' voltage refers to a constant DC voltage or to an AC voltage, and excludes electrical impulses i.e. unidirectional, one-off pulses.

The present invention also provides a method of disinfecting a liquid comprising: providing the above described apparatus; creating a voltage gradient between said electrodes and passing a liquid through said apparatus such that said liquid passes through said voltage gradient.

BRIEF DESCRIPTION OF THE INVENTION

By way of example only, preferred embodiments of the invention are described in detail with reference to the accompanying drawings in which:—

Figure 2:
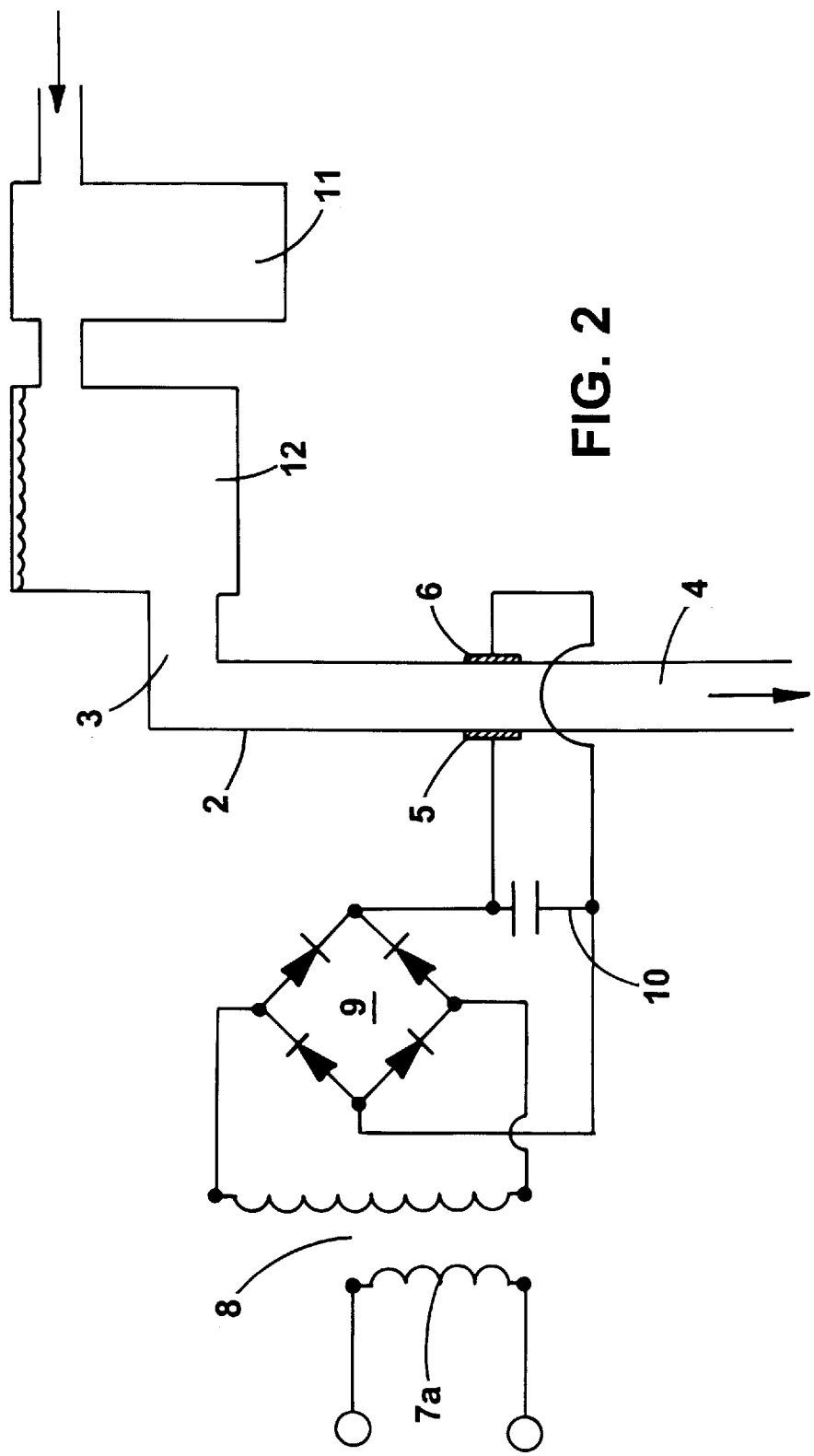

FIG. 1 shows in diagrammatic form the basic essentials of the present invention; and FIG. 2 shows in diagrammatic form a more elaborate form of the apparatus of the present invention.

MODE FOR CARRYING OUT THE INVENTION

Referring to FIG. 1, apparatus comprises a container 2 in the form of a tube having an inlet 3 and an outlet 4. Positioned within the tube, opposite to each other, are a pair of non-sacrificial electrodes 5, 6; each electrode is connected to one terminal of an electricity supply 7 which is mains powered and the output of which is (typically) 5,000 V. AC or DC, 0.2 amp.

In use, liquid to be disinfected (for example water) flows through the container 2 from inlet 3 to outlet 4, while a voltage is applied across the electrodes 5 and 6. The electrodes 5, 6 are in contact with the liquid to be disinfected and a voltage gradient is established across the portion of the liquid flowing between the two electrodes 5, 6.

It is known that if the membrane of the cell is ruptured (i.e. holes are created in the membrane) and the hole is sufficiently large, the cell cannot heal itself, and dies.

It is believed that in the present invention it is the presence of the voltage gradient across the cell membrane which kills the micro-organism:—the voltage gradient causes a dielectric breakdown of the membrane, causing electropermeabilization of the membrane and creating holes in the membrane. Providing the voltage gradient is large enough, these holes are too large to heal, even when the voltage gradient is removed, and the cell dies.

It is the voltage gradient which causes the disinfection, rather than electro-hydraulic shock or a current effect. There is no arcing between electrodes 5 and 6, and only a small current flows.

Problems can arise if the electrical conductivity of one liquid approaches that of the micro-organism, because it then becomes impossible to establish the necessary voltage gradient across the cell membrane.

DC is more effective than AC because there is no risk of micro-organisms passing through the treatment zone during the time period in which AC lies in that portion of its sinusoidal fluctuation in which the voltage has not yet built up to the necessary value sufficient to establish the required voltage gradient. This can be referred to as a threshold deadband. However, a problem with DC is that electrolysis of the electrodes may occur.

While both DC and AC waveforms have been shown to be effective in their disinfection role, the problems of electrolysis and deadband can be overcome by using a rectilinear AC waveform. This is obtained by rapid switching of the voltage between positive and negative DC buses. The AC nature of the waveform prevents electrolysis and the rectilinear waveshape removes all but the switching zone of the deadband.

FIG. 2 shows a more sophisticated version of the apparatus of FIG. 1:—as in FIG. 1, a container 2 has an inlet 3 and an outlet 4; water to be treated flows through this container 2. Inside the container, in contact with the water to be treated, are two parallel non-sacrificial electrodes 5 and 6. However, in the FIG. 2 embodiment, the mains AC supply 7a is fed through a step up transformer 8, a rectifier 9, and a smoothing capacitor 10 to give a 5,000 V DC supply applied between electrodes 5 and 6.

The electrodes 5 and 6 are made of stainless steel.

Before passing into the inlet 3, water to be treated passes through a deionizer of known type such as a chemical deionizer 11 and then through a gas entrapment device 12, also of known type.

The deionizer 11 is not essential, but is advantageous in that it reduces the conductivity of the water being treated, and therefore reduces the current requirement; this gives significant energy savings.

The gas entrapment device 12 likewise is not essential but may be required if gas bubbles are present in the fluid, since gas bubbles can cause break down and arcing between the electrodes.

As with the FIG. 1 apparatus, there is no arcing between the electrodes 5 and 6 in use, but simply the establishment of a voltage gradient, through which water to be treated passes as it flows through the container 2 towards the outlet 4.

However, if flow rates are very low, (of the order of 0.2 ml/minute) gas bubbles (believed to be hydrogen and oxygen) form at the electrodes; this leads to arcing as the applied voltage rises. This problem can be overcome either by increasing the flow-rate or by increasing the AC frequency above mains frequency.

The use of a DC voltage supply appears to increase the kill rate of bacteria in the water but very satisfactory effects nevertheless can be achieved by using an AC supply. Thus, in the FIG. 2 embodiment, it would be possible to achieve satisfactory disinfection by connecting the AC output from the step-up transformer directly to the electrodes 5 and 6.

The chamber 2 is made of an insulating material and is designed internally for laminar fluid flow therethrough. Preferably the electrodes are made of stainless steel or titanium.

The above-described apparatus may be modified to use more than one pair of electrodes 5, 6. In this case, the electrode pairs are spaced along the length of the container 2, with each electrode of each pair connected to the corresponding terminal of the electricity supply. For example, if a 3-phase electrical supply is used, one electrode pair can be connected to each phase.

Deionizers have a finite functional life, but the effectiveness of the deionizers can be monitored simply by measuring the current drawn by the apparatus:—as the deionizer becomes less effective, more ions are present in the water being treated, and the conductivity of the water therefore increases, resulting in a larger current passing through the water as it travels between electrodes 5 and 6. By monitoring this current, the effectiveness of the deionizer can be monitored and the system shut down automatically when the deionizer ceases to function effectively.

To set up the apparatus to disinfect a particular liquid, first it is necessary to determine the electrical conductivity of the liquid to be disinfected. This may be done using known methods.

Next, the desired flow rate of liquid through the apparatus is decided, and the apparatus is dimensioned to permit this flow-rate. The number of pairs of electrodes and the size and spacing of the electrodes is determined on the basis of the liquid's electrical conductivity and the desired flow rate.

Finally, the voltage gradient to be applied across the electrodes is determined on the basis of the liquid's electrical conductivity, the electrode size and spacing, the cell sizes and shapes of the micro-organism and the polarization of the micro-organism's membranes. All these factors may be determined by simple routine experiments, or are known from the literature.

The set-up apparatus is then tested by making a count of live micro-organisms in samples of liquid before treatments by the apparatus, passing the liquid through the apparatus in the manner hereinbefore described with reference to FIG. 2, and then making a count of live micro-organisms in samples of the treated liquid. The voltage applied to the liquid in the apparatus may be adjusted, if necessary, to give a desired kill rate of micro-organisms.

Tables I and II show results of tests carried out with water contaminated respectively with the bacteria *Escherichia coli* ("E. coli") and *serratia marcescens*. Both these bacteria are members of the enteric group of bacteria, and are gram negative with small, rod-shaped cells not exceeding 0.5 μm in width and about 1 μm in length.

*E. coli* is common in the intestinal tract of man and other vertebrates, and ingestion of food or liquid contaminated with *E. coli* can lead to gastrointestinal infections such as bacterial dysentery.

*E. coli* was selected for test purposes because it is a common water contaminant.

The apparatus for the test of Table I consisted of a rectangular-cross-section tube 12 mm×2 mm in cross-section, and 12 mm long. One pair of electrodes was used, each electrode being 12 mm long and 1 mm wide. The electrodes were arranged opposite each other in the tube, with 2 mm spacing between them.

TABLE I

| Flowrate (1/min) | Voltage (KV) | Percentage of *E. coli* Killed | |
|---|---|---|---|
| | | AC | DC |
| 0.5 | 3 | 99 | 100 |
| 0.25 | 3 | 99 | no test |

*Serratia marcescens* is a common water and soil organism.

*Serratia marcescens* was selected for test purposes because it is smaller than *E. coli* and is readily visible when test material is grown on plates, because it contains a red pigment. Also, *serratia marcescens* is harmless to human beings, and thus is a safe test micro-organism.

The apparatus for the test of Table II consisted of a rectangular cross-section tube 25 mm×2 mm in cross-section, and 25 mm long. One pair of electrodes was used, each electrode being 25 mm long and 1 mm wide. The electrodes were arranged on opposite sides of the tube with 2 mm between them.

TABLE II

| Flowrate (1/min) | Voltage (KV) | Percentage of *Serratia marcescens* Killed | |
|---|---|---|---|
| | | AC | DC |
| 3 | 4 | 27 | 98 |
| 2 | 4 | 40 | 97 |
| 1 | 4 | 83 | 98 |
| 1 | 4 | 83 | 99 |

It will be appreciated that in the above Tables, the heading "Voltage" refers to the voltage applied to the electrodes.

We claim:

1. Apparatus for disinfecting a continuous flow of an electrically conductive liquid, containing cells of microorganisms, said apparatus comprising;

a container having an inlet and an outlet, through which liquid to be disinfected flows in use;

at least one pair of non-sacrificial electrodes, said electrodes being positioned in said container so that liquid flowing through the container is in contact with said electrodes;

means for applying a steady-state electric voltage in the kilovolt range across said electrodes so as to create a voltage gradient between said electrodes;

said voltage gradient being such that an arc is not struck between said electrodes but a voltage gradient of at least one volt is produced across the membrane of any cell in said liquid, causing dielectric breakdown of the cell membrane and hence electro-permabilisation of said membrane.

2. Apparatus as claimed in claim 1 wherein said steady-state electric voltage is direct current.

3. Apparatus as claimed in claim 2 wherein said container is tubular and electrodes of the at least one pair are positioned in said container and spaced apart by a distance equal to the diameter of the container.

4. Apparatus as claimed in claim 2 wherein said container is of rectangular cross section.

5. Apparatus as claimed in claim 2 further comprising a de-ionizer connected to said container such that liquid to be disinfected in said container flows first through said de-ionizer.

6. Apparatus as claimed in claim 5 further comprising a gas-entrapment device connected between said de-ionizer and said container.

7. Apparatus as claimed in claim 2 wherein said electrodes are stainless steel.

8. Apparatus as claimed in claim 1, wherein said steady-state electric voltage is alternating current.

9. Apparatus as claimed in claim 8 wherein said container is tubular and electrodes of the at least one pair are positioned in said container and spaced apart by a distance equal to the diameter of the container.

10. Apparatus as claimed in claim 8 wherein said container is of rectangular cross section.

11. Apparatus as claimed in claim 8 further comprising a de-ionizer connected to said container such that liquid to be disinfected in said container flows first through said de-ionizer.

12. Apparatus as claimed in claim 11 further comprising a gas-entrapment device connected between said de-ionizer and said container.

13. Apparatus as claimed in claim 8 wherein said electrodes are stainless steel.

14. Apparatus as claimed in claim 8 wherein said alternating current is of rectilinear wave-form.

15. Apparatus as claimed in claim 14 wherein said container is tubular and electrodes of the at least one pair are positioned in said container and spaced apart by a distance equal to the diameter of the container.

16. Apparatus as claimed in claim 14 wherein said container is of rectangular cross section.

17. Apparatus as claimed in claim 14 further comprising a de-ionizer connected to said container such that liquid to be disinfected in said container flows first through said de-ionizer.

18. Apparatus as claimed in claim 17 further comprising a gas-entrapment device connected between said de-ionizer and said container.

19. Apparatus as claimed in claim 14 wherein said electrodes are stainless steel.

20. Apparatus in accordance with claim 1 wherein said container is tubular and the electrodes of each pair are positioned in said container and spaced apart by a distance substantially equal to the diameter of the container.

21. Apparatus as claimed in claim 20 wherein said container is of rectangular cross section.

22. Apparatus as claimed in claim 20 further comprising a de-ionizer connected to said container such that liquid to be disinfected in said container flows first through said de-ionizer.

23. Apparatus as claimed in claim 22 further comprising a gas-entrapment device connected between said de-ionizer and said container.

24. Apparatus as claimed in claim 20 wherein said electrodes are stainless steel.

25. Apparatus in accordance with claim 1 wherein said container is of rectangular cross-section.

26. Apparatus as claimed in claim 25 further comprising a de-ionizer connected to said container such that liquid to be disinfected in said container flows first through said de-ionizer.

27. Apparatus as claimed in claim 26 further comprising a gas-entrapment device connected between said de-ionizer and said container.

28. Apparatus as claimed in claim 25 wherein said electrodes are stainless steel.

29. Apparatus in accordance with claim 1 further comprising a de-ionizer connected to said container such that liquid to be disinfected in said container flows first through said de-ionizer.

30. Apparatus as claimed in claim 29 further comprising a gas-entrapment device connected between said de-ionizer and said container.

31. Apparatus as claimed in claim 30 wherein said electrodes are stainless steel.

32. Apparatus as claimed in claim 29 wherein said electrodes are stainless steel.

33. Apparatus as claimed in claim 1 wherein said means for supplying a steady-state electric voltage comprises a mains alternating-current electricity supply connected to said electrodes via a step-up transformer, a rectifier, and a smoothing capacitor.

34. Apparatus as claimed in claim 33 wherein said electrodes are stainless steel.

35. Apparatus in accordance with claim 1 wherein said electrodes are stainless steel.

36. A method of disinfecting a continuous flow of electrically conductive liquid containing cells of microorganisms flowing through a container having an inlet and an outlet with at least one pair of non-sacrificial electrodes positioned in said container so that liquid flowing through the container is in contact with said electrodes, said method comprising:

provided the apparatus claimed in anyone of the preceding, claims;

applying a steady-state electric voltage across said electrodes so as to create a voltage gradient of at least 1.5 kV/mm between said electrodes such that an arc is not struck between said electrodes but a voltage gradient of at least one volt is produced across the membrane of any cell in said liquid, causing dielectric breakdown of the cell membrane and hence electro-permabilisation of said membrane; and passing said liquid through said apparatus such that said liquid passes through said voltage gradient of at least 1.5 kV/mm.

* * * * *